Figure 1:
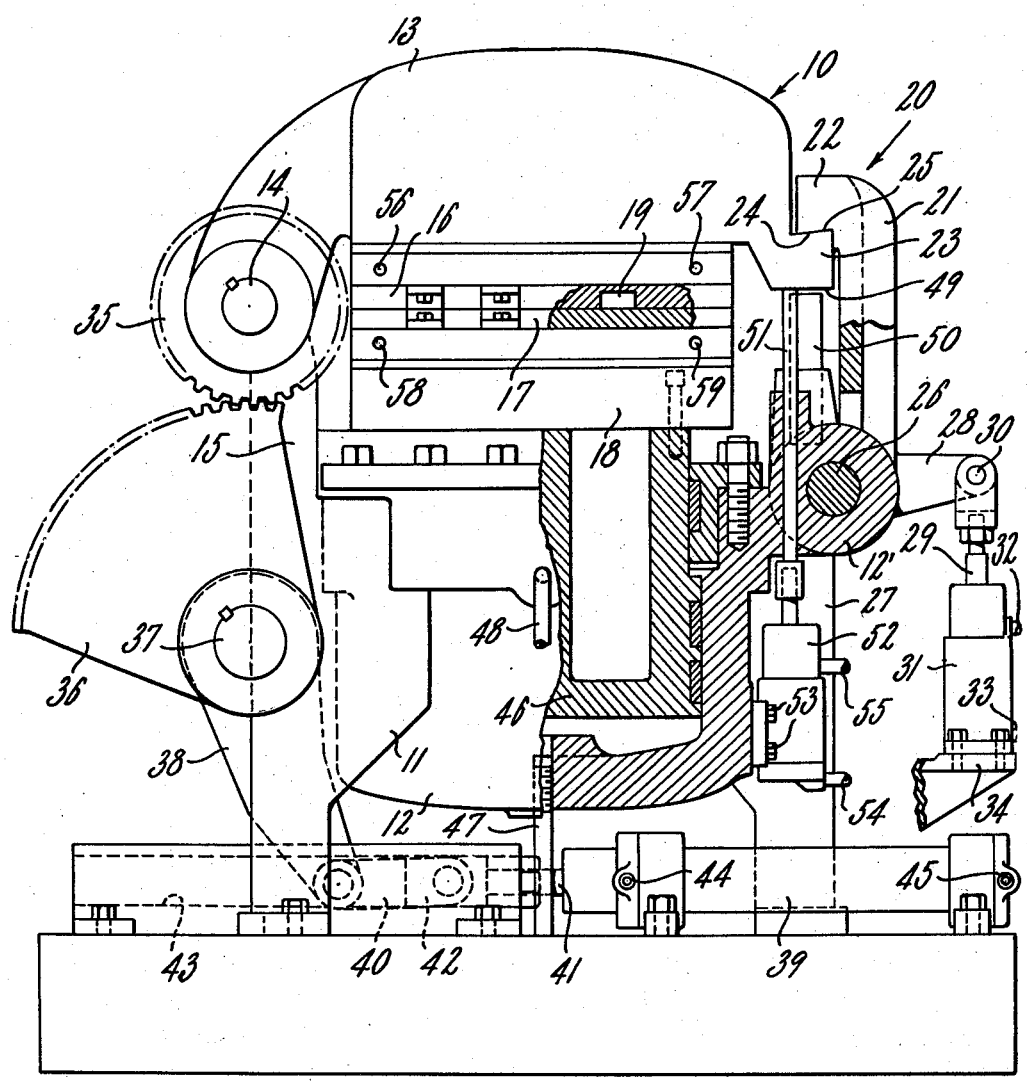

Feb. 3, 1959  O. F. HOMEIER  2,871,513
MOLDING PRESS
Filed March 3, 1954  2 Sheets-Sheet 1

INVENTOR.
OTTO F. HOMEIER
BY *William H. Epes*
ATTORNEY

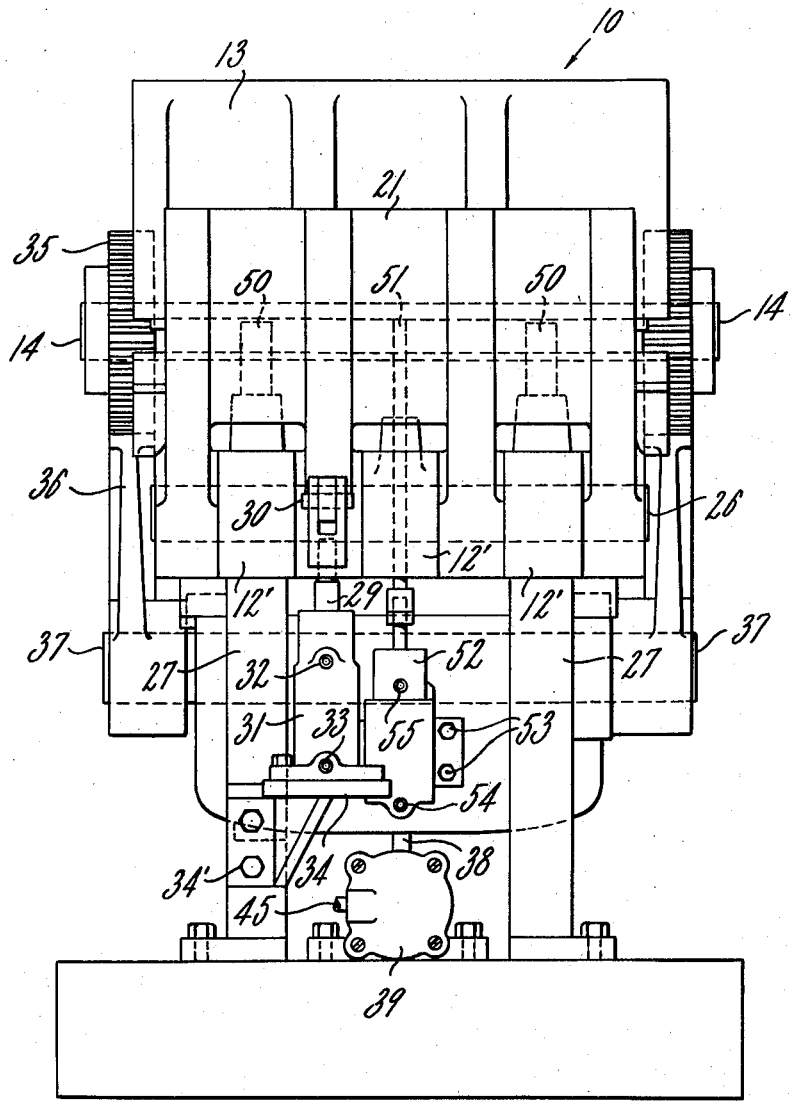

United States Patent Office 2,871,513
Patented Feb. 3, 1959

2,871,513

MOLDING PRESS

Otto F. Homeier, Dunedin, Fla., assignor to United States Rubber Company, New York, N. Y., a corporation of New Jersey Application March 3, 1954, Serial No. 413,851

1 Claim. (Cl. 18—16)

This invention relates to a molding press having a swinging top cover and a reciprocating ram. The invention relates particularly to the combination of a reciprocating ram, a swinging cover and a mechanism for locking the cover against the pressure of the ram, and arranging the faces of the mold plates carried by the cover and the ram parallel with each other when the press cover is locked in place.

In presses comprising the combination of a swinging cover and a ram, very large pressure loads are exerted by the ram on the cover to produce high molding pressures on the plastic material being molded between the ram and the cover. Relatively massive and slow moving locks have been heretofore used to resist the pressure of the ram against the swinging cover and to lock it in place. In accordance with the present invention a relatively simple, quick acting, and yet relatively strong locking mechanism has been devised to lock the swinging cover in molding position against the high pressure of the ram. Such mechanism has the advantage of being particularly safe against release under the pressure of the ram, and the further advantage of arranging the faces of the mold plates parallel with each other at the time pressure is exerted on material between the mold plates. The latter feature eliminates strains on the mold plates, and insures the proper sealing of the mold cavities.

This invention will be further described in reference to the accompanying drawings, in which:

Fig. 1 is a side elevational view of a molding press embodying this invention, with parts broken away to illustrate the interior parts of the press; and Fig. 2 is a front elevational view of the molding press, as viewed from the right of Fig. 1.

Referring to the drawings, the press 10 is mounted in a frame 11 to which the ram cylinder 12 is securely attached. The frame supports both said cylinder and the pivoted cover 13, which latter member is pivotally mounted on a shaft 14 journaled on the rear upright legs 15 of said frame, said shaft and legs thereby forming a pivotal joint connecting said cover to said cylinder.

The press is shown in its closed position with the upper mold plate 16, carried by the cover 13, clamped against the lower mold plate 17 by the ram 18 which carries the latter mold plate. The upper plate 16 is provided with mold cavities 19 (only one of which is shown) which are closed by the lower plate 17 in the position shown in Fig. 1.

The press 10 is locked in its closed position by a locking mechanism 20 comprising a swing link or plate 21 pivoted on the frame 11 and having a locking head 22, which extends along the top edge of the plate 21. The head 22 projects over an outwardly projecting shoulder 23 on the forward edge of the cover 13 and secures it against movement with respect to the frame 11. The lower face 24 of the head 21 is inclined downwardly towards the press cover and makes contact with the upper face 25 of the shoulder 23 which is inclined upwardly away from the cover 13 and towards the locking head 22 of the plate 21. The inclined faces 24 and 25 prevent the cover lock from being released while the ram 18 is applying pressure to the cover 13. The plate 21 is pivoted on a shaft 26, which is journaled in projections 12' on the cylinder 12. The plate 21 is operated by an arm 28 which is pivotally attached to a piston rod 29 by a pin 30. The rod 29 is operated by a piston in the cylinder 31 upon the admission and exhaust of hydraulic fluid to the ports 32 and 33 of the cylinder 31. The cylinder 31 is supported on a bracket 34, which is secured to one of the forward legs 27 of the frame 11 by bolts 34', as seen in Fig. 2.

The press cover 13 is pivoted about the pin or shaft 14 by a gear 35 keyed thereto and meshing with a gear sector 36, which is keyed to a shaft 37 journaled in the rear legs 15 of the frame 11. The gear sector 36 is provided with an arm 38 which is operated by a hydraulic cylinder 39. The piston in the cylinder 39 is connected to the arm 38 by the link 40 which is pivotally connected to the piston rod 41. The end of the piston rod 41 is provided with a slide 42 which operates in a guide 43. The operation of the piston in the cylinder 39 is controlled by the admission and exhaust of hydraulic fluid to the cylinder through the ports 44 and 45.

The ram 18 is operated by the piston 46 in the cylinder 12, to which hydraulic fluid may be admitted to either side thereof through the conduits 47 and 48.

In order to permit the downwardly inclined face 24 on the locking head 22 to pass over the upwardly inclined face 25 on the locking shoulder 23 of the press cover 13, the lower face 49 of the locking shoulder 23 is dropped downwardly onto the supporting columns or stops 50. In order to bring the faces 24 and 25 into contact with each other, and to arrange the face of the molding plate 16 parallel with the upper face of the lower molding plate 17 before such faces are brought into contact by the upward movement of the ram 18, a lifting rod 51 is brought into contact with the lower face 49 of the locking shoulder 23 to raise the shoulder to the position shown in Fig. 1. The lifting rod 51 is operated by a piston in a hydraulic cylinder 52 which is attached to the base of the cylinder 12 by bolts 53, as shown in Figs. 1 and 2. The piston is operated by the admission and exhaust of hydraulic fluid through the ports 54 and 55.

The operation of the press is described below, beginning with the parts in the closed position of the press, as shown in the drawings. In such position the molded articles have been cured in the cavities 19 by the admission and exhaust of steam through circulaing passages in the upper and lower mold plates 16 and 17 through the ports 56, 57, 58 and 59. The flow of fluid through all of the foregoing ports and passages may readily be controlled by suitable valves (not shown). In order to open the press and remove the molded articles, the ram 18 is lowered by exhausting hydraulic fluid through the port 47 and admitting hydraulic fluid through the upper port 48. The lifting rod 51 is lowered by exhausing hydraulic fluid through the port 54 and admitting hydraulic fluid to the port 55 of the cylinder 52. The lower face 49 of the locking shoulder 23 then drops and comes to rest on the supporting columns or stops 50, and the locking head 22 is then swung to the right, as viewed in Fig. 1, by admitting hydraulic fluid to the port 32 and exhausting it from the port 33 of the cylinder 31. The press cover is now free to be swung about the pivot 14 by admitting hydraulic fluid to the port 45 and exhausting it from the port 44 of the cylinder 39. The cover 13 is preferably swung through 180°, so as to place the mold cavities 19 in the plate 16 facing upwardly. The molded articles are removed from the cavities 19, and the cavities are again filled with moldable plastic blanks to be formed into other moldable articles. The press may then be closed by carrying out the foregoing press opening operations in the reverse order.

While this invention has been described more or less in detail, it will be understood that changes in such details may be made without departing from the spirit of the invention, and it is intended to cover all such changes which come within the scope of the appended claim.

Having thus described my invention, what I claim and desire to protect by Letters Patent is:

A molding press comprising the combination of a ram operating in a cylinder and a cover having a pivotal connection with said cylinder, means for swinging said cover back and forth over said ram, a locking mechanism for withstanding the pressure of said ram against said cover when over said ram in its press closed position, said locking mechanism comprising a locking shoulder on one side of said cover opposite to said pivotal connection of said cover and a swinging link connected to said cylinder below said shoulder, a stop for supporting said cover over said ram at a position below its press closed position, said link having a locking head provided with a downwardly inclined face which is adapted to extend over said locking shoulder on said cover and in spaced relation thereto when the latter is supported on said stop, said locking shoulder having a face which is upwardly inclined towards said locking head, means for moving said face on said locking head into and out of locking position over said face on said shoulder while said faces are spaced apart, and means for raising and lowering said face on said shoulder into and out of engagement with said face on said locking head to thereby move said cover into and out of its press closed position, said last mentioned means being separate from said means for swinging said cover.

References Cited in the file of this patent
UNITED STATES PATENTS

| | | |
|---|---|---|
| 654,389 | Ellinwood et al. | July 24, 1900 |
| 1,579,480 | Hoover | Apr. 6, 1927 |
| 1,640,949 | Loomis | Aug. 30, 1927 |
| 2,672,652 | Hoew et al. | Mar. 23, 1954 |